(12) United States Patent
Takahashi et al.

(10) Patent No.: US 12,704,403 B2
(45) Date of Patent: Aug. 11, 2026

(54) OPTICAL PATH TESTING DEVICE AND OPTICAL PATH TESTING METHOD

(71) Applicant: NTT, Inc., Tokyo (JP)

(72) Inventors: Hiroshi Takahashi, Musashino (JP); Yoshifumi Wakisaka, Musashino (JP); Daisuke Iida, Musashino (JP); Yusuke Koshikiya, Musashino (JP)

(73) Assignee: NTT, Inc., Tokyo (JP)

( * ) Notice: Subject to any disclaimer, the term of this patent is extended or adjusted under 35 U.S.C. 154(b) by 71 days.

(21) Appl. No.: 18/995,909

(22) PCT Filed: Aug. 1, 2022

(86) PCT No.: PCT/JP2022/029467
§ 371 (c)(1),
(2) Date: Jan. 17, 2025

(87) PCT Pub. No.: WO2024/028939
PCT Pub. Date: Feb. 8, 2024

(65) Prior Publication Data
US 2026/0043685 A1 Feb. 12, 2026

(51) Int. Cl.
*G01H 9/00* (2006.01)
*G01D 5/353* (2006.01)
*G01M 11/02* (2006.01)

(52) U.S. Cl.
CPC ......... *G01H 9/004* (2013.01); *G01D 5/35358* (2013.01); *G01D 5/35393* (2013.01); *G01M 11/02* (2013.01)

(58) Field of Classification Search
CPC ............... G01H 9/004; G01D 5/35358; G01D 5/35393; G01M 11/02
See application file for complete search history.

(56) References Cited

U.S. PATENT DOCUMENTS

2011/0228255 A1* 9/2011 Li .......................... G01B 11/18 356/32
2014/0176937 A1* 6/2014 Liu .................... G01D 5/35329 356/73.1

(Continued)

FOREIGN PATENT DOCUMENTS

JP 2020-169904 A 10/2020

OTHER PUBLICATIONS

Masoudi et al., "Contributed Review: Distributed optical fibre dynamic strain sensing", Review of Scientific Instruments, vol. 87, Jan. 8, 2016, pp. 011501-1-011501-9.

(Continued)

*Primary Examiner* — Dominic J Bologna
(74) *Attorney, Agent, or Firm* — XSENSUS LLP

(57) ABSTRACT

An optical path testing device and an optical path testing method divide output light from a laser light source into a probe optical path and a local optical path and convert modulated light obtained by modulating input light of the probe optical path into probe light including pulsed light, generate a beat signal by causing signal light and input light of the local optical path to interfere with each other, acquire a signal indicating backscattered light in the optical fiber on the basis of the beat signal, and analyzes a loss distribution, when generating the modulated light, perform first modulation and second modulation, and generate an analysis signal by averaging the backscattered light in each different frequency band included in the beat signal between the different frequency bands and acquire the loss distribution by analyzing an intensity of the backscattered light included in the analysis signal.

6 Claims, 5 Drawing Sheets

(56) References Cited

U.S. PATENT DOCUMENTS

| | | | | |
|---|---|---|---|---|
| 2019/0094049 | A1* | 3/2019 | Iwamura | G01D 5/35335 |
| 2022/0155139 | A1* | 5/2022 | Wakisaka | G01D 5/35383 |
| 2026/0029256 | A1* | 1/2026 | Takahashi | G01D 5/35361 |

OTHER PUBLICATIONS

Nishiguchi et al., "Fabrication of Fiber-Optic Distributed Acoustic Sensor and Its Signal Processing", IEICE Technical Report, Aug. 2015, pp. 29-34 (6 pages including English Abstract).
Wakisaka et al., "Fading Suppression of ϕ-OTDR With the New Signal Processing Methodology of Complex Vectors", Journal of Lightwave Technology, vol. 39, No. 13, Jul. 1, 2021, pp. 4287-4293.
Shimizu et al., "Characteristics and Reduction of Coherent Fading Noise in Rayleigh Backscattering Measurement for Optical Fibers and Components", Journal of Lightwave Technology, vol. 10, No. 7, Jul. 1992, pp. 982-987.
Song et al., "A Novel Multi-frequency Coherent OTDR for Fast Fading Noise Reduction", OFC/NFOEC Technical Digest © 2012 OSA, pp. 1-3.

* cited by examiner

OPTICAL PATH TESTING DEVICE AND OPTICAL PATH TESTING METHOD

CROSS-REFERENCE TO RELATED APPLICATION

This application is a national stage application, pursuant to 35 U.S.C. § 371, of International Patent Application No. PCT/JP2022/029467, filed Aug. 1, 2022, the entire contents of which are incorporated herein by reference.

TECHNICAL FIELD

The present invention relates to an optical path testing device and an optical path testing method.

BACKGROUND ART

Non Patent Literature 1 discloses a method called distributed acoustic sensing (DAS) capable of measuring physical vibration around a measurement target optical fiber by detecting a change in phase caused by a minute change in an optical fiber length due to vibration transmitted to the optical fiber.

Non Patent Literature 2 discloses that, when a method of observing a temporal change in phase of scattered light from each point of an optical fiber is used, a phase linearly changes with respect to a change in an optical path length of an optical fiber caused by vibration. Non Patent Literature 2 further discloses that, because a rate of change in phase can be considered to be approximately the same at each point in the longitudinal direction of the optical fiber, it is possible to quantitatively measure the vibration and thus to faithfully reproduce a vibration waveform applied to the measurement target optical fiber.

Non Patent Literature 3 and Patent Literature 1 disclose a technique of calculating a phase on the basis of scattered light having each wavelength from an optical fiber (optical path) into which wavelength-multiplexed pulsed light has entered, thereby measuring physical vibration transmitted to the optical fiber. According to the techniques of Non Patent Literature 3 and Patent Literature 1, frequency division multiplexing (FDM) for averaging scattered light vectors at different frequencies is performed on a scattered light vector indicating scattered light at each frequency to generate a frequency average vector. Then, the vibration transmitted to the optical fiber is measured based on a phase of the frequency average vector. Deterioration in sensitivity due to interference between scattered light beams within a pulse width (duration of pulsed light) is suppressed by FDM, thereby improving measurement accuracy of the vibration transmitted to the optical fiber.

Non Patent Literature 4 discloses a technique of combining frequency shift averaging (FSAV) for averaging scattered light by changing a frequency of pulsed light entering into an optical fiber, thereby measuring a loss of the optical fiber. According to the technique of Non Patent Literature 4, fading noise caused by interference between the scattered light beams within a pulse width is suppressed by FSAV, thereby improving measurement accuracy of the loss of the optical fiber.

Non Patent Literature 5 discloses a method of increasing an effect of FSAV and reducing a measurement time to about a fraction (1/16 in Non Patent Literature 5) by using a double sideband generated in an optical modulator.

CITATION LIST

Patent Literature

Patent Literature 1: JP 2020-169904 A

Non Patent Literature

Non Patent Literature 1: Ali. Masoudi, T. P. Newson, "Contributed Review: Distributed optical fibre dynamic strain sensing" Review of Scientific Instruments, vol. 87, p. 011501(2016)

Non Patent Literature 2: Kenichi Nishiguchi, Li Che-Hsien, Artur Guzik, Mitsunori Yokoyama, Kinzo Kishida, "Fabrication of Fiber-Optic Distributed Acoustic Sensor and Its Signal Processing", IEICE Technical Report, 115(202), pp. 29-34(2015)

Non Patent Literature 3: Yoshifumi Wakisaka, Daisuke Iida, Hiroyuki Oshida, and Nazuki Honda, "Fading Suppression of o-OTDR With the New Signal Processing Methodology of Complex Vectors Across Time and Frequency Domains", J. Lightwave Technology, Vol. 39, No. 13, pp. 4279-4293 (2021)

Non Patent Literature 4: K. Shimizu, T. Horiguchi, Y. Koyamada, "Characteristics and Reduction of Coherent Fading Noise in Rayleigh Backscattering Measurement for Optical Fibers and Components", J. Lightwave Technology, Vol. 10, No. 7, pp. 982-987 (1992)

Non Patent Literature 5: Yuejiang Song, Lidong Lu, and Xuping Xhang, "A Novel Multi-frequency Coherent OTDR for Fast Fading Noise Reduction", OFC/NFOEC Technical Digest 2012, OTu1C.4 (2012)

SUMMARY OF THE INVENTION

Technical Problem

According to the technique disclosed in Patent Literature 1, the vibration is measured based on the phase of the scattered light, and thus accuracy in measuring the vibration transmitted to the optical fiber is limited by phase noise depending on a line width (frequency width) of a light source that generates pulsed light. In order to reduce the phase noise, the line width of the light source that generates pulsed light is desirably narrow. Meanwhile, according to the technique disclosed in Non Patent Literature 4, it is necessary to change the frequency in order to suppress the fading noise. In order to obtain a large variation width of the frequency, the line width of the light source is desirably wide.

As described above, a requirement required for the light source to measure the physical vibration transmitted to the optical fiber is different from a requirement required for the light source to measure the loss of the optical fiber. Therefore, it is difficult to perform measurement of the physical vibration transmitted to the optical fiber and measurement of the loss of the optical fiber by using the same light source.

The present invention has been made in view of the above problem. An object thereof is to provide an optical path testing device and an optical path testing method capable of performing measurement of physical vibration transmitted to an optical fiber and measurement of a loss of the optical fiber by using the same light source.

Solution to Problem

In order to solve the above problem, an optical path testing device and an optical path testing method according to one aspect of the present invention divide output light from a laser light source into a probe optical path and a local optical path and convert modulated light obtained by modulating input light of the probe optical path into probe light including pulsed light. The optical path testing device and the optical path testing method generate a beat signal by causing signal light emitted from one end of an optical fiber when the probe light enters into the one end and input light of the local optical path to interfere with each other, acquire a signal indicating backscattered light in the optical fiber on the basis of the beat signal, and analyzes a loss distribution. When generating the modulated light, the optical path testing device and the optical path testing method perform first modulation in which a plurality of modulations based on at least two or more different first frequencies is sequentially performed for a duration of an optical frequency output from the laser light source and second modulation in which modulation is performed based on a second frequency that changes by a predetermined amount of change for each period of the pulsed light. The optical path testing device and the optical path testing method generate an analysis signal by averaging the backscattered light in each different frequency band included in the beat signal between the different frequency bands and acquire the loss distribution by analyzing an intensity of the backscattered light included in the analysis signal.

Advantageous Effects of Invention

According to the present invention, it is possible to perform measurement of physical vibration transmitted to an optical fiber and measurement of a loss of the optical fiber by using the same light source.

DESCRIPTION OF EMBODIMENTS

Next, embodiments of the present invention will be described in detail with reference to the drawings. In the description, the same components are denoted by the same reference signs, and redundant description will be omitted.

Configuration of Optical Path Testing Device

Figure 1:
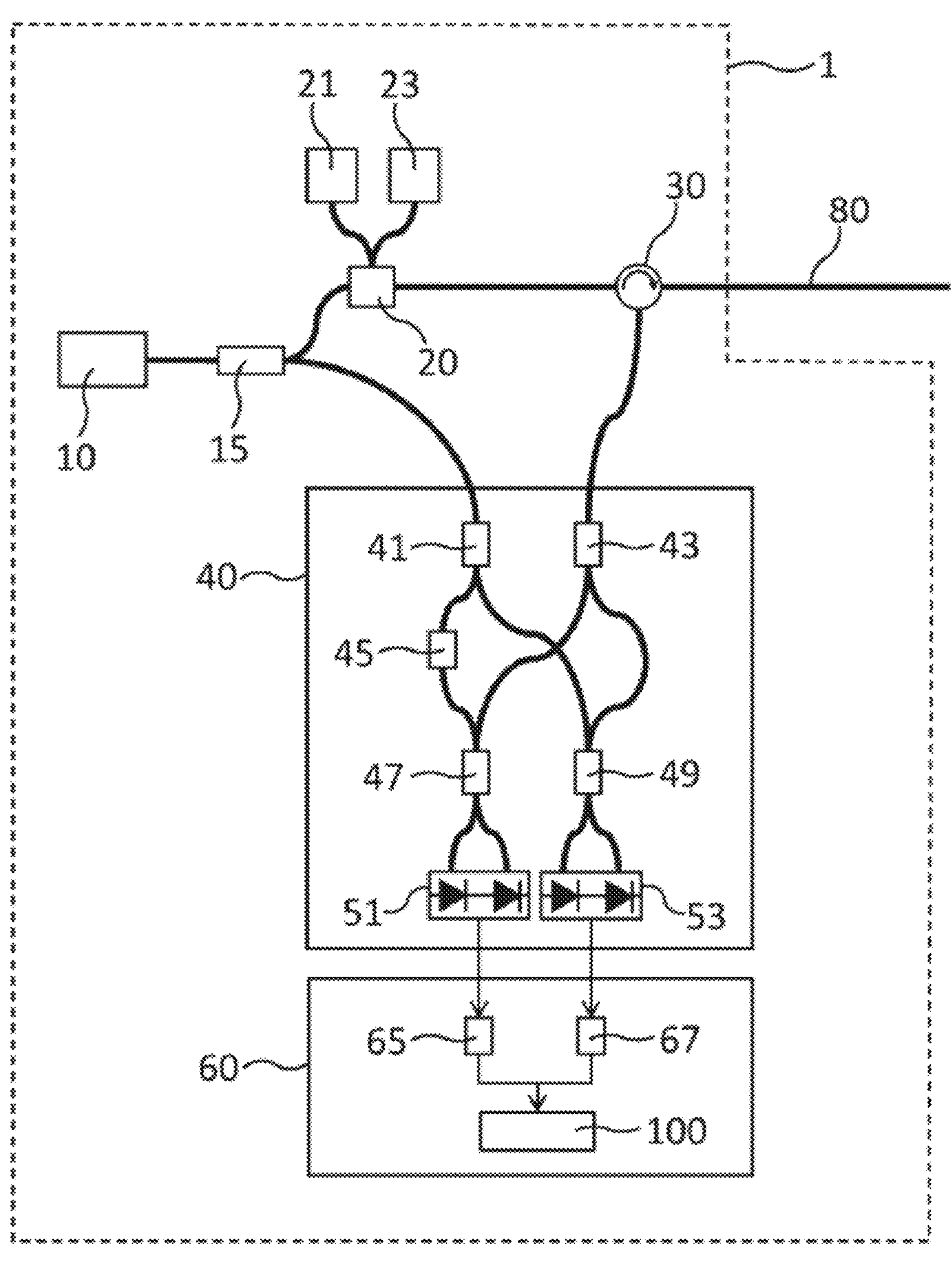
FIG. 1 is a block diagram showing a configuration of an optical path testing device according to an embodiment of the present invention.

A configuration example of an optical path testing device according to the present embodiment will be described with reference to FIG. 1. As shown in FIG. 1, an optical path testing device 1 includes a light source 10, a modulator 20, an interference device 40, and a signal analysis unit 60. The optical path testing device 1 may further include a coupler 15 (branching unit), a signal generator 21, a pulse generator 23, and a circulator 30.

The light source 10 outputs output light (e.g., continuous light having a single wavelength of a frequency $f_0$). The light source 10 can change the frequency of the output light. For example, the light source 10 is a fiber laser or the like having a general narrow line width and is a light source having a line width of about 1 kHz. The light source 10 is not limited to the examples described herein. The output light from the light source 10 is divided by the coupler 15. One beam of the output light divided by the coupler 15 enters into the modulator 20 serving as a probe optical path. The other beam of the output light divided by the coupler 15 enters into the interference device 40 serving as a local optical path.

The modulator 20 modulates the output light from the light source 10 to generate modulated light and converts the modulated light into probe light including pulsed light. The modulator 20 may generate the modulated light by performing frequency modulation on the output light on the basis of a predetermined signal (modulated signal) generated by the signal generator 21. Further, the modulator 20 may convert the modulated light into probe light including a plurality of continuous pulsed light beams at a predetermined period T on the basis of a pulse signal generated by the pulse generator 23.

For example, the modulator 20 may be a single side-band modulator (SSB modulator) or an acousto-optics modulator (AO modulator). In order to increase an extinction ratio in the pulsed light, a semiconductor optical amplifier or the like may be used.

When generating the modulated light, the modulator 20 performs, on the output light, first modulation in which a plurality of modulations based on at least two or more different first frequencies is sequentially performed for a duration of the pulsed light (i.e. a minimum value of a time during which the light source 10 continuously outputs a single optical frequency within the line width) and second modulation in which modulation is performed based on a second frequency that changes by a predetermined amount of change for each period of the pulsed light.

Figure 2:
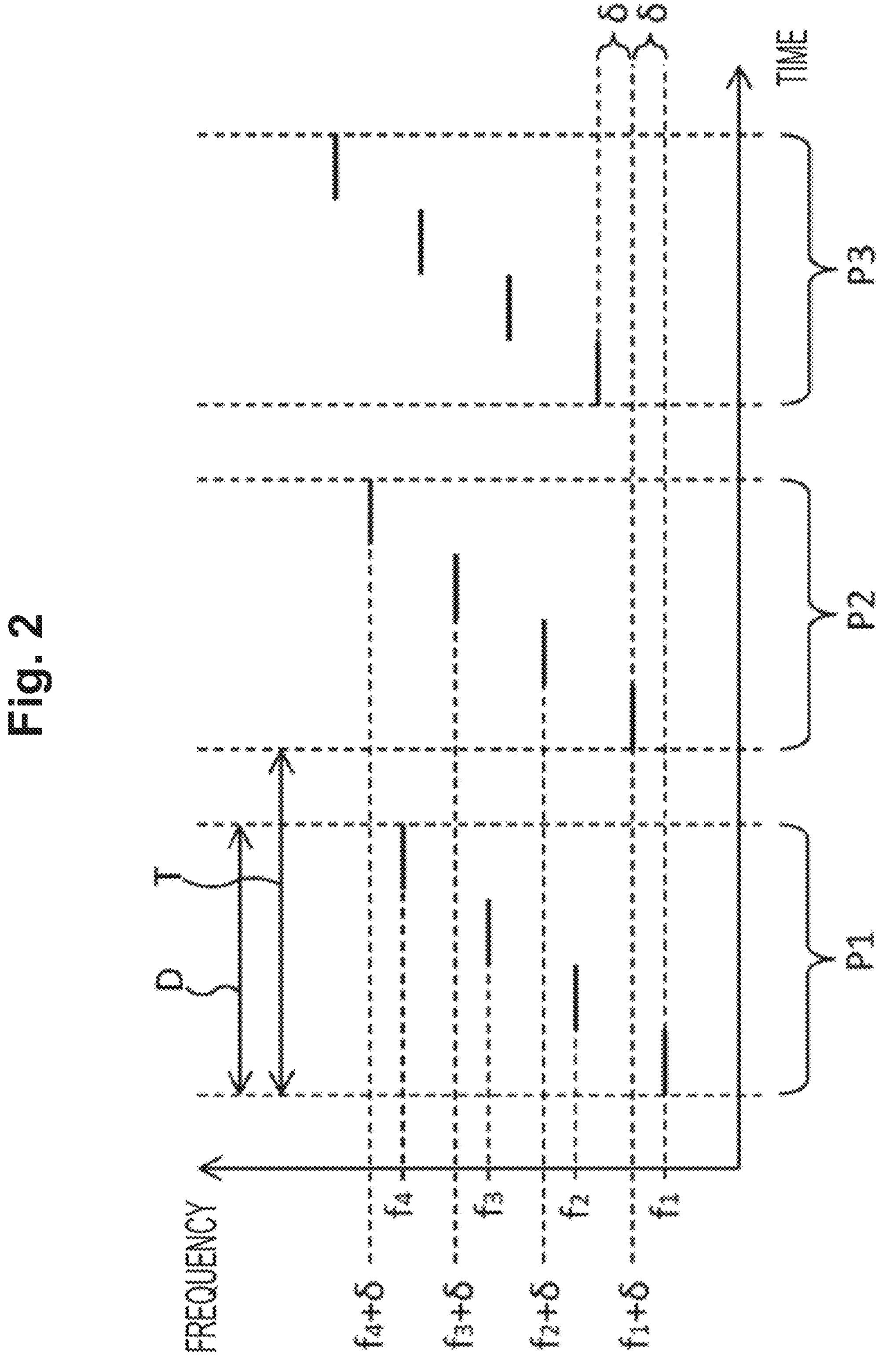
FIG. 2 shows an example of frequency modulation by a modulator

FIG. 2 shows an example of frequency modulation by the modulator 20. By the first modulation by the modulator 20, the frequency of the modulated light is changed N times (N is an integer of 2 or more) for a duration D of the pulsed light, and the frequency $f_0$ is changed to first frequencies $f_1$, $f_2$, $f_3$, . . . , and $f_N$. The first frequencies $f_1$, $f_2$, $f_3$, . . . , and $f_N$ are different frequencies. FIG. 2 shows a state in which the frequency modulation is performed four times on pulsed light P1 where N=4.

By the second modulation by the modulator 20, the frequency of the modulated light is changed by a predetermined amount of change δ for each period T of the pulsed light, and the frequency $f_0$ is changed to second frequencies $f_0$, $f_0+\delta$, $f_0+2\delta$, $f_0+3\delta$, . . . , and $f_0+(M-1)\delta$. Here, a positive integer M indicates the number of pulsed light beams within the duration of the output light from the light source 10. FIG. 2 shows a state in which, as a result of the second modulation, the modulated frequency in pulsed light P2 (second pulsed light) changes by δ as compared with the modulated frequency in the pulsed light P1 (first pulsed light). FIG. 2 further shows a state in which, as a result of the second modulation, the modulated frequency in pulsed light P3 (third pulsed light) changes by 2δ as compared with the modulated frequency in the pulsed light P1. As described above, the modulated frequency in the j-th (j is an integer satisfying $1 \le j \le M$) pulsed light is changed by $(j-1)\delta$ as compared with the modulated frequency in the pulsed light P1 (first pulsed light).

A frequency width of the output light from the light source 10 may be smaller than a minimum difference between the different first frequencies or the predetermined amount of change δ. The "minimum difference between the different first frequencies" is defined as the smallest value among all $|f_a-f_b|$(a and b are integers, 1≤a≤N, 1≤b≤N, and a≠b). This makes it possible to greatly vary the wavelength of the probe light while using the light source 10 having a narrow line width. Therefore, it is possible to increase an effect of frequency shift averaging (FSAV) for averaging scattered light by changing a frequency of pulsed light entering into an optical fiber 80.

The minimum difference between the different first frequencies and the predetermined amount of change δ may be coprime. This makes it possible to increase the effect of FSAV by greatly varying the wavelength of the probe light while using the light source 10 having a narrow line width. It is also possible to widely disperse the wavelength of the probe light and increase the effect of FSAV.

The circulator 30 causes the probe light output from the modulator 20 to enter into one end of the optical fiber 80 to be tested by the optical path testing device 1. When the probe light enters into the optical fiber 80 via the circulator 30, light scattered or reflected at each point in the longitudinal direction of the optical fiber 80 returns to the circulator 30 as signal light. Therefore, the circulator 30 causes the signal light emitted from the one end of the optical fiber 80 to enter into the interference device 40.

Because the signal light includes the light scattered or reflected at each point in the longitudinal direction of the optical fiber 80, the signal light includes information regarding the optical fiber 80. Therefore, by analyzing the signal light, it is possible to acquire information regarding a loss distribution in the optical fiber 80 and information regarding vibration transmitted to the optical fiber 80.

The scattering by the optical fiber 80 includes, for example, Rayleigh scattering. Rayleigh scattering is a phenomenon in which a traveling direction of light changes due to interaction of the light with fine particles sufficiently smaller than the wavelength of the light. When light is transmitted through the optical fiber 80, random fluctuations in density included in the optical fiber 80 (e.g., fluctuation in density of glass and fluctuation in density of additive) become fluctuations in refractive index, and thus Rayleigh scattering occurs. As a result of Rayleigh scattering, a loss of the optical fiber 80 occurs. The loss caused by Rayleigh scattering is inversely proportional to the fourth power of the wavelength on the short wavelength side.

The interference device 40 receives the signal light emitted from the one end of the optical fiber when the probe light enters into the one end and generates a beat signal by causing the signal light and the output light to interfere with each other.

For example, the output light from the light source 10 enters into a coupler 41 of the interference device 40. The signal light from the optical fiber 80 enters into a coupler 43 of the interference device 40. The coupler 41 and the coupler 43 each have a branching ratio of 50:50. One beam of the output light divided by the coupler 41 is shifted in phase by π/2 by a phase shifter 45 and enters into a coupler 47. The other beam of the output light divided by the coupler 41 enters into a coupler 49. One beam of the signal light divided by the coupler 43 enters into the coupler 47. The other beam of the signal light divided by the coupler 43 enters into the coupler 49.

The coupler 47 emits the output light having the phase shifted by π/2 and the signal light to a balance detector 51 (optical reception unit). The coupler 49 emits the output light and the signal light to a balance detector 53 (optical reception unit).

The balance detector 51 outputs a quadrature component included in the signal light as an electric signal on the basis of the output light having the phase shifted by π/2 and the signal light. The balance detector 53 outputs an in-phase component included in the signal light as an electric signal on the basis of the output light and the signal light.

The outputs from the balance detector 51 and the balance detector 53 are output to the signal analysis unit 60 as a beat signal.

The signal analysis unit 60 acquires a loss distribution in the optical fiber 80 on the basis of the beat signal generated by the interference device 40.

For example, the quadrature component of the beat signal is converted into a digital signal by an AD conversion element 65 and is input to a controller 100. The in-phase component of the beat signal is converted into a digital signal by an AD conversion element 67 and is input to the controller 100.

A computer program for functioning as analysis means for analyzing scattering by the optical fiber 80 is installed in the controller 100. By executing the computer program, the controller 100 functions as a plurality of information processing circuits. The computer program may be stored in a recording medium readable and writable by a computer or may be provided through a network.

The present embodiment shows an example where the plurality of information processing circuits is implemented by software. However, the information processing circuits can also be configured by preparing dedicated hardware for executing each piece of information processing described below. The plurality of information processing circuits may also be configured by individual hardware.

For example, the controller 100 analyzes the scattered light by the optical fiber 80 included in the signal light on the basis of the beat signal and acquires a loss distribution in the optical fiber 80. For example, it is possible to acquire scattered light of pulsed light having different frequencies by the modulation by the modulator 20. The controller 100 may acquire the loss distribution in the optical fiber 80 by combining FSAV. Fading noise caused by interference between the scattered light beams within a pulse width is suppressed by FSAV, thereby improving measurement accuracy of the loss of the optical fiber 80.

The controller 100 may analyze the vibration transmitted to the optical fiber on the basis of the beat signal. For example, the controller 100 can calculate a scattered light vector indicating scattered light at each frequency on the basis of the beat signal and performs frequency division multiplexing (FDM) for averaging scattered light vectors at different frequencies to generate a frequency average vector. Then, the vibration transmitted to the optical fiber may be analyzed based on a phase of the frequency average vector. Deterioration in sensitivity due to interference between the scattered light beams within the pulse width (duration of pulsed light) is suppressed by FDM, thereby improving measurement accuracy of the vibration transmitted to the optical fiber 80.

In order to implement FSAV and FDM, the controller 100 may generate an analysis signal by averaging intensity signals in respective different frequency bands included in the beat signal between the different frequency bands and acquire a loss distribution on the basis of the analysis signal. Note that the controller 100 may acquire the intensity signals by performing Fourier transform on the beat signal.

The method of acquiring the intensity signals is not limited to the above example, and, for example, the intensity signal in each different frequency band may be acquired by using a digital filter.

Figure 3:
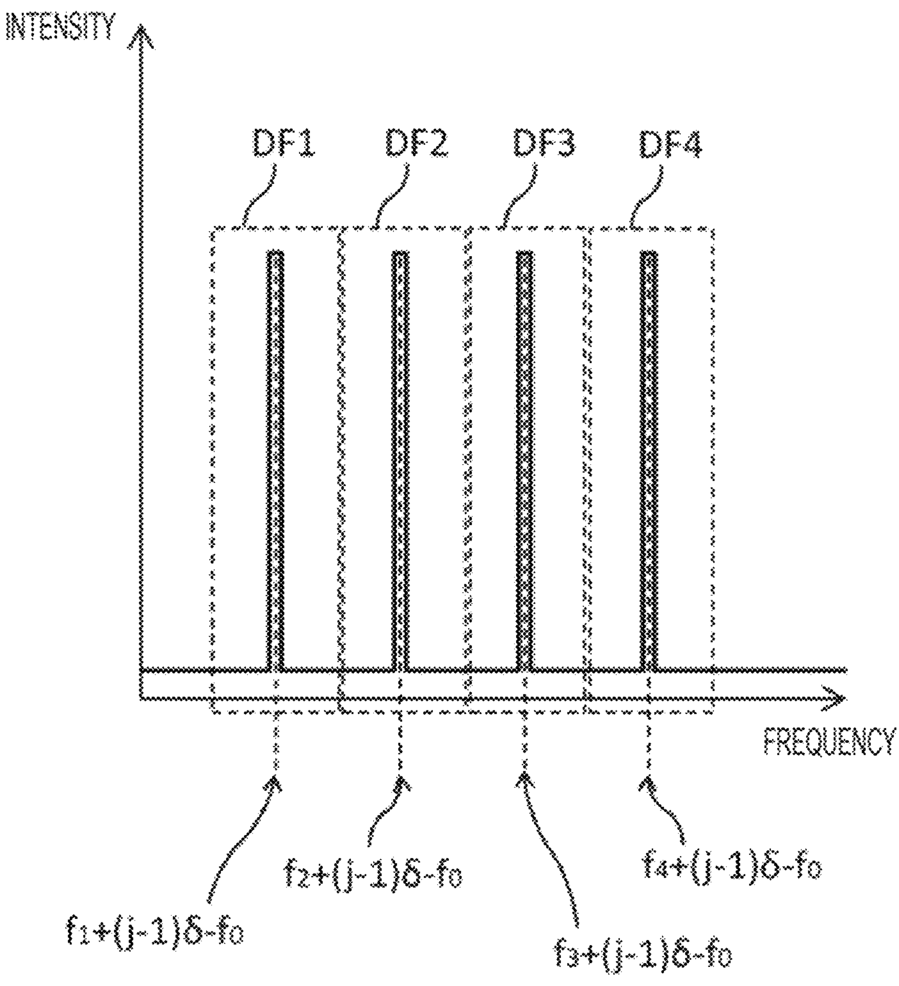
FIG. 3 shows an example of intensity signals included in a beat signal.

FIG. 3 shows an example of the intensity signals included in the beat signal. FIG. 3 shows a state in which, as a result of the interference between the signal light and the output light, a peak occurs at a position of a frequency corresponding to a difference between a frequency of light included in the signal light and the frequency of the output light. The frequency $f_0$ of the output light is changed to "$f_k+(j-1)\delta$" (k is an integer satisfying $1 \leq k \leq N$, and j is an integer satisfying $1 \leq j \leq M$) by the first modulation and the second modulation by the modulator 20. Therefore, the beat signal includes intensity signals having a frequency indicated by "$f_k+(j-1)\delta-f_0$".

Thus, in order to separate and extract each intensity signal, the signal analysis unit 60 applies Fourier transform or a digital filter to the beat signal and extracts an intensity of the signal for each frequency band including each intensity signal. In FIG. 3, frequency bands DF1, DF2, DF3, and DF4 are shown as frequency bands different from each other.

Here, a width of the frequency band extracted by the signal analysis unit 60 may be set to be smaller than the "minimum difference between the different first frequencies". The frequency "$f_k+(j-1)\delta-f_0$" of the intensity signal varies for each period T of the pulsed light. Here, if the width of the frequency band is set as described above, the signal analysis unit 60 can reliably separate and extract each intensity signal in a fixed frequency band, regardless of variation in the frequency of the intensity signal. As a result, it is possible to reduce a calculation load on the controller 100. This eliminates the need for changing the filter according to the variation in the frequency of the intensity signal, thereby simplifying the configuration of the entire device.

Processing Procedure of Optical Path Testing Device

Figure 4:
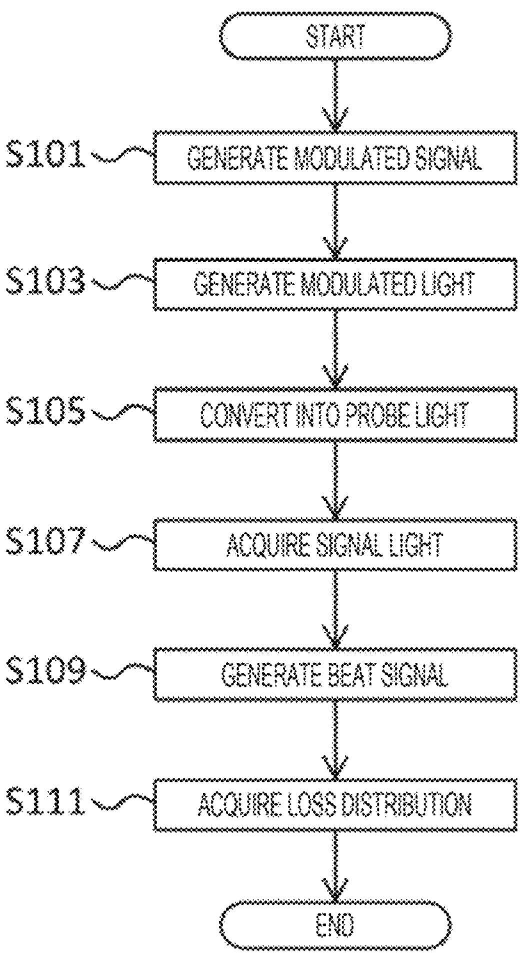
FIG. 4 is a flowchart showing processing of an optical path testing device according to an embodiment of the present invention.

Next, a processing procedure of the optical path testing device 1 according to the present embodiment will be described with reference to a flowchart of FIG. 4. FIG. 4 is a flowchart showing processing of the optical path testing device 1 according to the present embodiment.

In step S101, the signal generator 21 generates a modulated signal. Further, the pulse generator 23 generates a pulse signal.

In step S103, the modulator 20 modulates output light from the light source 10 and generates modulated light.

In step S105, the modulator 20 converts the modulated light into probe light including pulsed light.

In step S107, the interference device 40 acquires signal light emitted from the one end of the optical fiber when the probe light enters into the one end.

In step S109, the interference device 40 generates a beat signal by causing the signal light and the output light to interfere with each other.

In step S111, the signal analysis unit 60 acquires a loss distribution in the optical fiber 80 on the basis of the beat signal generated by the interference device 40.

Effects of Embodiment

As described above, the optical path testing device and the optical path testing method according to the present embodiment divide output light from a laser light source into a probe optical path and a local optical path and convert modulated light obtained by modulating input light of the probe optical path into probe light including pulsed light. The optical path testing device and the optical path testing method generate a beat signal by causing signal light emitted from one end of an optical fiber when the probe light enters into the one end and input light of the local optical path to interfere with each other, acquire a signal indicating backscattered light in the optical fiber on the basis of the beat signal, and analyzes a loss distribution. When generating the modulated light, the optical path testing device and the optical path testing method perform first modulation in which a plurality of modulations based on at least two or more different first frequencies is sequentially performed for a duration of an optical frequency output from the laser light source and second modulation in which modulation is performed based on a second frequency that changes by a predetermined amount of change for each period of the pulsed light. The optical path testing device and the optical path testing method generate an analysis signal by averaging the backscattered light in each different frequency band included in the beat signal between the different frequency bands and acquire the loss distribution by analyzing an intensity of the backscattered light included in the analysis signal.

This makes it possible to perform measurement of physical vibration transmitted to the optical fiber and measurement of a loss of the optical fiber by using the same light source. In particular, even if the line width of the light source that generates pulsed light is narrowed in order to improve measurement accuracy of the vibration transmitted to the optical fiber, it is possible to obtain a large variation width of the frequency necessary for improving measurement accuracy of the loss of the optical fiber. That is, even in a case where the line width of the light source is narrow, fading noise can be suppressed by FSAV, which makes it is possible to achieve both improvement in the measurement accuracy of the vibration transmitted to the optical fiber and improvement in the measurement accuracy of the loss of the optical fiber.

When FSAV is performed with a large variation width of the frequency, it is possible to reduce a time necessary for acquiring an intensity signal included in the beat signal for each frequency band. For example, there will be described a case where FSAV in which the variation width of the frequency necessary for obtaining sufficient accuracy is 10 GHz is performed by using a light source having the line width of 1 kHz and the duration of 100 ms which is a minimum value of a time during which the light source continuously outputs a single optical frequency within the line width. In this case, the number of frequency bands necessary for acquiring the intensity signals is 10 GHz/1 kHz=10 million. Therefore, in a case where the modulation is not performed by the modulator 20, a time necessary for acquiring the intensity signals in all the frequency bands is determined by the product of the duration and the number of necessary frequency bands, that is, 100 ms×10 million=1 million seconds.

Meanwhile, as described in the present embodiment, in a case where the modulation is performed by the modulator 20, it is possible to reduce the time necessary for acquiring the intensity signals in all the frequency bands by increasing the number M of pulsed light beams existing within the duration of the light source and the number of times N of changing the frequency of the modulated light for the duration of the pulsed light.

As a case where the modulation is performed by the modulator 20, there will be described a case where the number of the pulsed light beams existing within the duration of the light source is 100 (i.e. the period of the pulsed light is 1 ms) and the number of times N of changing the frequency of the modulated light is 40. In this case, it is possible to acquire intensity signals in 40×100=4000 frequency bands during 100 ms that is the duration of the light source. Therefore, the time necessary for acquiring the intensity signals in all the frequency bands is 100 ms/4000× 10 million=250 seconds. That is, it is possible to achieve a speed increase of 4000 times. Thus, the time necessary for acquiring the intensity signals can be significantly reduced in a case where the modulation is performed by the modulator 20, as compared with a case where modulation is not performed by the modulator 20.

The optical path testing device and the optical path testing method according to the present embodiment may acquire the loss distribution by analyzing scattered light by the optical fiber included in the signal light on the basis of the beat signal. The signal light used to generate the beat signal includes light scattered or reflected at each point in the longitudinal direction of the optical fiber to be tested. Therefore, it is possible to analyze the scattered light by the optical fiber included in the signal light on the basis of the beat signal. Further, because components caused by the scattered light (Rayleigh scattering) by the optical fiber occupy most of the signal light, it is possible to accurately acquire the loss distribution by analyzing the scattered light.

The optical path testing device and the optical path testing method according to the present embodiment may generate an analysis signal by averaging intensity signals in respective different frequency bands included in the beat signal between the different frequency bands and acquire the loss distribution on the basis of the analysis signal. This makes it possible to suppress fading noise caused by interference between the scattered light beams within a pulse width and improve the measurement accuracy of the loss of the optical fiber.

The optical path testing device and the optical path testing method according to the present embodiment may acquire the intensity signals by performing Fourier transform on the beat signal. This makes it possible to accurately acquire the intensity signals in the different frequency bands included in the beat signal.

The optical path testing device and the optical path testing method according to the present embodiment may acquire the vibration transmitted to the optical fiber on the basis of the beat signal. The signal light used to generate the beat signal includes light scattered or reflected at each point in the longitudinal direction of the optical fiber to be tested. In particular, the signal light includes information regarding an increase or decrease in the length in the longitudinal direction, and thus it is possible to acquire the vibration transmitted to the optical fiber on the basis of a change in the phase of the beat signal.

In the optical path testing device and the optical path testing method according to the present embodiment, a frequency width of the output light may be smaller than a minimum difference between the different first frequencies or the predetermined amount of change. This makes it possible to increase the effect of FSAV by greatly varying the wavelength of the probe light while using the light source having a narrow line width.

In the optical path testing device and the optical path testing method according to the present embodiment, the minimum difference between the different first frequencies and the predetermined amount of change may be coprime. This makes it possible to increase the effect of FSAV by greatly varying the wavelength of the probe light while using the light source having a narrow line width. It is also possible to widely disperse the wavelength of the probe light and increase the effect of FSAV.

Others

Figure 5:
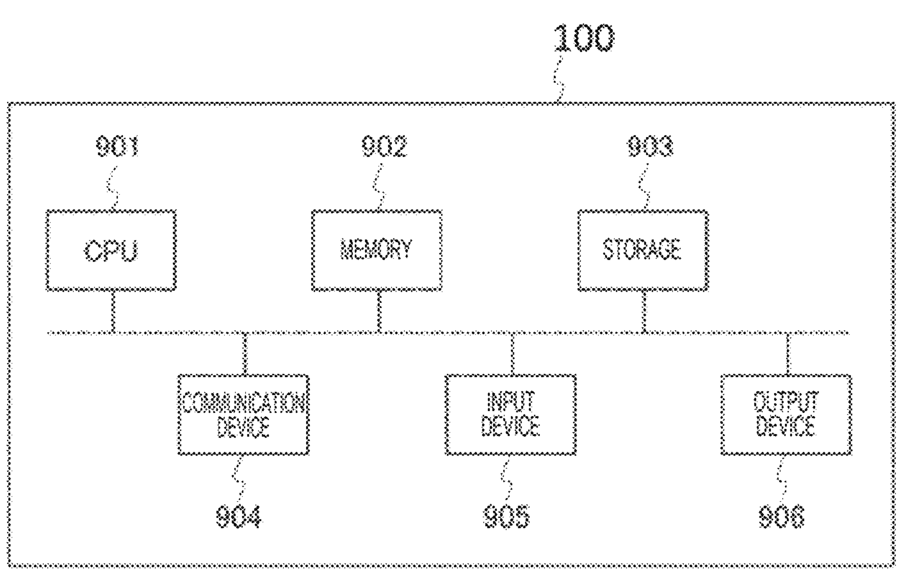
FIG. 5 shows a hardware configuration of a controller.

For example, as shown in FIG. 5, the controller 100 described above can be implemented by using a general-purpose computer system including a CPU 901, a memory 902, a storage 903, a communication device 904, an input device 905, and an output device 906. The memory 902 and the storage 903 are storage devices. In the computer system, each function of the controller 100 is implemented by the CPU 901 executing a predetermined program loaded on the memory 902.

The controller 100 may be implemented by one computer. The controller 100 may be implemented by a plurality of computers. The controller 100 may be a virtual machine implemented in a computer. The program for the controller 100 can be stored in a computer-readable recording medium such as an HDD, SSD, USB memory, CD, or DVD. The program for the controller 100 can also be distributed via a communication network.

Each function described in the above embodiment can be implemented by one or a plurality of processing circuits. The processing circuits include programmed processors, electrical circuits, and the like and further include devices such as application-specific integrated circuits (ASIC), circuit components arranged to execute the described functions, and the like.

Although the contents of the present invention have been described above according to the embodiment, the present invention is not limited to the description thereof, and it is obvious to those skilled in the art that various modifications and improvements can be made. It should not be construed that the present invention is limited to the description and the drawings that constitute a part of the present disclosure. Various alternative embodiments, examples, and operating techniques will be apparent to those skilled in the art from this disclosure.

It is needless to say that the present invention also includes various embodiments that are not described herein. Therefore, the technical scope of the present invention is to be defined only by the invention specifying matters according to the scope of claims appropriately obtained from the above description.

REFERENCE SIGNS LIST

1 optical path testing device
10 light source
15, 41, 43, 47, 49 coupler
20 modulator
21 signal generator
23 pulse generator
30 circulator
40 interference device
45 phase shifter
51, 53 balance detector
60 signal analysis unit
65, 67 AD conversion element
80 optical fiber
100 controller

The invention claimed is:

1. An optical path testing device comprising:

a laser light source;

a branching unit that divides output light from the laser light source into a probe optical path and a local optical path;

a modulator that modulates input light of the probe optical path to generate modulated light and converts the modulated light into probe light including pulsed light;

an interference device that receives signal light emitted from one end of an optical fiber when the probe light enters into the one end and generates a beat signal by causing the signal light and input light of the local optical path to interfere with each other;

an optical reception unit that acquires backscattered light in the optical fiber on a basis of the beat signal; and a signal analysis unit that analyzes a loss distribution on a basis of a signal of the optical reception unit, wherein:

the modulator generates the modulated light by performing, on the output light, a first modulation in which a plurality of modulations based on at least two or more different first frequencies is sequentially performed for a duration of an optical frequency output from the laser light source, and a second modulation in which modulation is performed based on a second frequency that changes by a predetermined amount of change for each period of the pulsed light; and the signal analysis unit generates an analysis signal by averaging the backscattered light in each different frequency band included in the beat signal between the different frequency bands, and acquires the loss distribution by analyzing an intensity of the backscattered light included in the analysis signal.

2. The optical path testing device according to claim 1, wherein the signal analysis unit acquires an intensity signal in the each different frequency band included in the beat signal by performing Fourier transform on the beat signal.

3. The optical path testing device according to claim 1, wherein the signal analysis unit acquires vibration transmitted to the optical fiber on a basis of the beat signal.

4. The optical path testing device according to claim 1, wherein a frequency width of the output light is smaller than a minimum difference between the different first frequencies or the predetermined amount of change.

5. The optical path testing device according to claim 1, wherein a minimum difference between the different first frequencies and the predetermined amount of change are coprime.

6. An optical path testing method comprising:

dividing output light from a laser light source into a probe optical path and a local optical path;

modulating input light of the probe optical path to generate modulated light;

converting the modulated light into probe light including pulsed light;

generating a beat signal by causing signal light emitted from one end of an optical fiber when the probe light enters into the one end and input light of the local optical path to interfere with each other;

acquiring a signal indicating backscattered light in the optical fiber on a basis of the beat signal; and analyzing a loss distribution on a basis of the signal, wherein:

when the modulated light is generated, a first modulation in which a plurality of modulations based on at least two or more different first frequencies is sequentially performed for a duration of an optical frequency output from the laser light source, and a second modulation in which modulation is performed based on a second frequency that changes by a predetermined amount of change for each period of the pulsed light are performed on the output light;

an analysis signal is generated by averaging the backscattered light in each different frequency band included in the beat signal between the different frequency bands; and the loss distribution is acquired by analyzing an intensity of the backscattered light included in the analysis signal.

* * * * *